(12) United States Patent
Goransson et al.

(10) Patent No.: US 9,392,440 B2
(45) Date of Patent: Jul. 12, 2016

(54) BASE STATION, USER EQUIPMENT AND METHODS THEREIN

(71) Applicant: TELEFONAKTIEBOLAGET L M ERICSSON (PUBL), Stockholm (SE)

(72) Inventors: Bo Goransson, Sollentuna (SE); Erik Larsson, Uppsala (SE); Peter Von Wrycza, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 216 days.

(21) Appl. No.: 13/978,004

(22) PCT Filed: Mar. 19, 2013

(86) PCT No.: PCT/SE2013/050303
§ 371 (c)(1),
(2) Date: Jul. 2, 2013

(87) PCT Pub. No.: WO2013/141803
PCT Pub. Date: Sep. 26, 2013

(65) Prior Publication Data
US 2014/0078959 A1    Mar. 20, 2014

Related U.S. Application Data

(60) Provisional application No. 61/612,828, filed on Mar. 19, 2012.

(51) Int. Cl.
*H04W 4/00*    (2009.01)
*H04W 8/22*    (2009.01)
(Continued)

(52) U.S. Cl.
CPC .............. *H04W 8/22* (2013.01); *H04B 7/0404* (2013.01); *H04B 7/0413* (2013.01); *H04B 7/063* (2013.01);
(Continued)

(58) Field of Classification Search
USPC .......... 370/329, 216, 252, 311, 328; 375/267, 375/299, E1.002, 141, 146; 455/450, 500
See application file for complete search history.

(56) References Cited

U.S. PATENT DOCUMENTS

2006/0281417 A1* 12/2006 Umesh .................. H04L 1/0007
455/69
2007/0002801 A1* 1/2007 Usuda .................. H04L 1/0025
370/333
(Continued)

FOREIGN PATENT DOCUMENTS

WO    0027052 A1    5/2000
WO    2011127358 A1    10/2011

OTHER PUBLICATIONS

Nokia Siemens Networks, "MiMO with 64 QAM for HSUSPA", 3GPP TSG RAN Meeting #54, Berlin, Germany, Dec. 6-9, 2011, RP-111642, 15 pages.*
(Continued)

*Primary Examiner* — Phuongchau Ba Nguyen
(74) *Attorney, Agent, or Firm* — Rothwell, Figg, Ernst & Manbeck, P.C.

(57) ABSTRACT

Embodiments herein relate to a method in a base station (12) for providing feedback to a user equipment (14) for transmissions of a secondary stream out of a primary and a secondary stream of the user equipment (14) in an uplink Multiple Input Multiple Output mode. The base station (12) transmits to the user equipment (14), a preferred transmission rank and an offset for the secondary stream in a channel, wherein the offset is to be used by the user equipment (14) when deciding transport block size of the secondary stream and the preferred transmission rank is to be used by the user equipment (14) when deciding a transmission rank.

30 Claims, 5 Drawing Sheets

(51) Int. Cl.
*H04B 7/04* (2006.01)
*H04B 7/06* (2006.01)
*H04W 72/14* (2009.01)
*H04L 1/00* (2006.01)
*H04W 28/04* (2009.01)
*H04L 1/18* (2006.01)

(52) U.S. Cl.
CPC ............. *H04L 1/0006* (2013.01); *H04W 72/14* (2013.01); *H04L 1/0025* (2013.01); *H04L 1/0072* (2013.01); *H04L 1/1822* (2013.01); *H04W 28/04* (2013.01)

(56) References Cited

U.S. PATENT DOCUMENTS

| | | | |
|---|---|---|---|
| 2007/0133458 A1* | 6/2007 | Chandra et al. | 370/329 |
| 2012/0287965 A1* | 11/2012 | Sambhwani et al. | 375/141 |
| 2013/0195044 A1* | 8/2013 | Pelletier | H04W 72/04 370/329 |

OTHER PUBLICATIONS

Pelletier, U.S. Appl. No. 61/591,840, filed Jan. 27, 2012.*
Pelletier, U.S. Appl. No. 61/611,927, filed Mar. 16, 2012.*
Written Opinion dated Mar. 4, 2014, in International Application No. PCT/SE2013/050303, 5 Pages.
3GPP, "Chairman's notes of the UTRA maintenance, MIMO with 64QAM for HSUPA and LCR TDD HSPA feedback and signaling efficiency enhancement study sessions," 3GPP TSG RAN WG1 Meeting #68, Feb. 2012, 5 pages.
3GPP, "Downlink Grant Channel Design for UL MIMO," 3GPP TSG RAN WG1 Meeting 68, R1-120662, Feb. 2012, 4 pages.
3GPP, "On Downlink Aspects for Uplink MIMO with 64QAM," 3GPP TSG-RAN WG1 #68bis, R1-121771, Mar. 2012, 4 pages.
International Search Report Issued in corresponding International Application No. PCT/SE2013/050303, dated Jul. 10, 2013, 12 pages.
International Preliminary Report on Patentability issued in corresponding International Application No. PCT/SE2013/050303, dated Jun. 12, 2014, 20 pages.
Ericsson, "Design Aspects for Uplink MIMO and 64QAM", 3GPP TSG RAN WG1 Meeting #68, Dresden, Germany, Feb. 6-10, 2012,R1-120343, 8 pages.
3GPP, "3rd Generation Partnership Project; Technical Specification Group Radio Access Network; Medium Access Control (MAC) protocol specification (Release 11)", 3GPP TS 25.321 V11.0.0, Dec. 2011, 198 pages.
3GPP, "3rd Generation Partnership Project; Technical Specification Group Radio Access Network; Multiplexing and channel coding (FDD) (Release 11)", 3GPP TS 25.212 V11.0.0, Dec. 2011, 129 pages.
3GPP, "3rd Generation Partnership Project; Technical Specification Group Radio Access Network; Spreading and modulation (FDD) (Release 11)", 3GPP TS 25.213 V11.0.0, Dec. 2011, 43 pages.
3GPP, "3rd Generation Partnership Project; Technical Specification Group Radio Access Network; Physical layer procedures (FDD) (Release 11)", 3GPP TS 25.214 V11.0.0, Dec. 2011, 106 pages.
3GPP, "3rd Generation Partnership Project; Technical Specification Group Radio Access Network; Uplink Multiple Input Multiple Output (MIMO) for High Speed Packet Access (HSPA) (Release 11)", 3GPP TS 25.871 V11.0.0, Sep. 2011, 18 pages.
Nokia Siemens Networks, "MIMO with 64QAM for HSUPA", 3GPP TSG RAN Meeting #54, Berlin, Germany, Dec. 6-9, 2011, RP-111642, 15 pages.

* cited by examiner

BASE STATION, USER EQUIPMENT AND METHODS THEREIN

CROSS REFERENCE TO RELATED APPLICATION(S)

This application is a 35 U.S.C. §371 National Phase Entry Application from PCT/SE2013/050303, filed Mar. 19, 2013, which claims priority to U.S. Provisional Application 61/612,828, filed Mar. 19, 2012, the disclosures of which are incorporated herein in their entirety by reference.

TECHNICAL FIELD

Embodiments herein relate to a base station, a user equipment and methods therein. In particular, embodiments herein relate to configuring transmissions for a secondary stream out of a first and the secondary stream.

BACKGROUND

In a typical radio communications network, wireless terminals, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" in Universal Mobile Telecommunications System (UMTS) or "eNodeB" Long Term Evolution (LTE). A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A UMTS is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipments. In a forum known as the Third Generation Partnership Project (3GPP), telecommunications suppliers propose and agree upon standards for e.g. third generation networks and further generations, and investigate enhanced data rate and radio capacity.

At 3GPP RAN#54 plenary meeting a Work Item (WI) on Multiple Input Multiple Output (MIMO) with 64 Quadrature amplitude modulation (QAM) for High Speed Uplink Packet Access (HSUPA) was initiated, see RP-111642, "MIMO with 64 QAM for HSUPA". The WI initialization was a result of extensive studies regarding potential benefits and solutions performed during the study item (SI) phase; see TR 25.871, "Uplink Multiple Input Multiple Output (MIMO) for High Speed Packet Access (HSPA)" v11.0.0. for a summary of the findings.

For a UE configured in uplink MIMO mode either single or dual-stream transmissions can take place; also referred to as rank1 and rank2 transmissions, respectively. Dual-stream transmissions are mainly useful in environments with high Signal-to-interference-and-noise ratios (SINR), and where the channel exhibits scattering, and/or cross-polarized antennas are used. When single-stream transmissions are scheduled, the pre-coding gain will instead improve the link budget.

Grant and E-TFC Selection Procedure

For legacy UEs, Transport Block Size (TBS) is set and controlled via a grant & Enhanced Dedicated Transport Channel Transport Format Combination (E-TFC) selection procedure. Enhanced Dedicated Transport Channel may be abbreviated as E-DCH. The grant, which is defined as the power ratio between the Enhanced Dedicated Transport Channel Dedicated Physical Data Channel (E-DPDCH) and Dedicated Physical Control Channel (DPCCH), is controlled by the network, for example the RNC or the radio base station, via absolute and relative grants transmitted over an E-DCH Absolute Grant Channel (E-AGCH) and E-DCH Relative Grant Channel (E-RGCH) channels, respectively. The grant is essentially a power measure which allows the network to control the interference a certain UE is allowed to create. The grant gives the UE an "upper bound" on how much data it may transmit, and the exact number of data bits will depend on power and buffer statuses, and essentially a formula configured via a number of reference values signaled by higher-layers; see e.g. sub-clause 11.8.1.4 in TS-25.321, "Medium Access Control (MAC) protocol specification", v11.0.0. However, the grant may sometimes generate a non-optimal transmission for UEs in MIMO operation resulting in a reduced performance of the wireless communications network.

SUMMARY

An object of embodiments herein is to enable transmission from a user equipment with an improved performance of the wireless communications network.

According to an aspect the object is achieved by a method in a base station for providing feedback to a user equipment for transmissions of a secondary stream out of a primary and a secondary stream of the user equipment in an uplink Multiple Input Multiple Output mode. The base station transmits to the user equipment, a preferred transmission rank and an offset for the secondary stream in a channel. The offset is to be used by the user equipment when deciding a transport block size of the secondary stream and the preferred transmission rank is to be used by the user equipment when deciding a transmission rank.

According to another aspect the object is achieved by a method in a user equipment for handling transmissions of a secondary stream out of a primary and a secondary stream wherein the user equipment is in an uplink Multiple Input Multiple Output mode. The user equipment monitors a channel, from a base station, carrying a preferred transmission rank and an offset for the secondary stream. The user equipment uses the preferred transmission rank and the offset when transmitting data in the secondary stream. The offset is used to decide a transport block size of the secondary stream and the preferred transmission rank is used to decide a transmission rank.

According to yet another aspect the object is achieved by a base station adapted for providing feedback to a user equipment for transmissions of a secondary stream out of a primary and a secondary stream of the user equipment in an uplink Multiple Input Multiple Output mode. The base station comprises a transceiver circuit configured to transmit, to the user equipment, a preferred transmission rank and an offset for the secondary stream in a channel. The offset is to be used by the user equipment when deciding a transport block size of the secondary stream and the preferred transmission rank is to be used by the user equipment when deciding a transmission rank.

According to still another aspect the object is achieved by a user equipment adapted for handling transmissions of a secondary stream out of a primary and a secondary stream wherein the user equipment is in an uplink Multiple Input Multiple Output mode. The user equipment comprises a control and processing circuit configured to monitor a channel, from a base station, carrying a preferred transmission rank and an offset for the secondary stream. The control and processing circuit is further configured to use the preferred transmission rank and the offset when transmitting data in the secondary stream. The offset is used to decide a transport block size of the secondary stream and the preferred transmission rank is used to decide a transmission rank.

Embodiments herein disclose how to signal the offset used to set the transport block size for the secondary stream leading a more efficient transmission from the user equipment resulting in an improved performance of the wireless communications network.

BRIEF DESCRIPTION OF THE DRAWINGS

Embodiments will now be described in more detail in relation to the enclosed drawings, in which.

DETAILED DESCRIPTION

Figure 1:
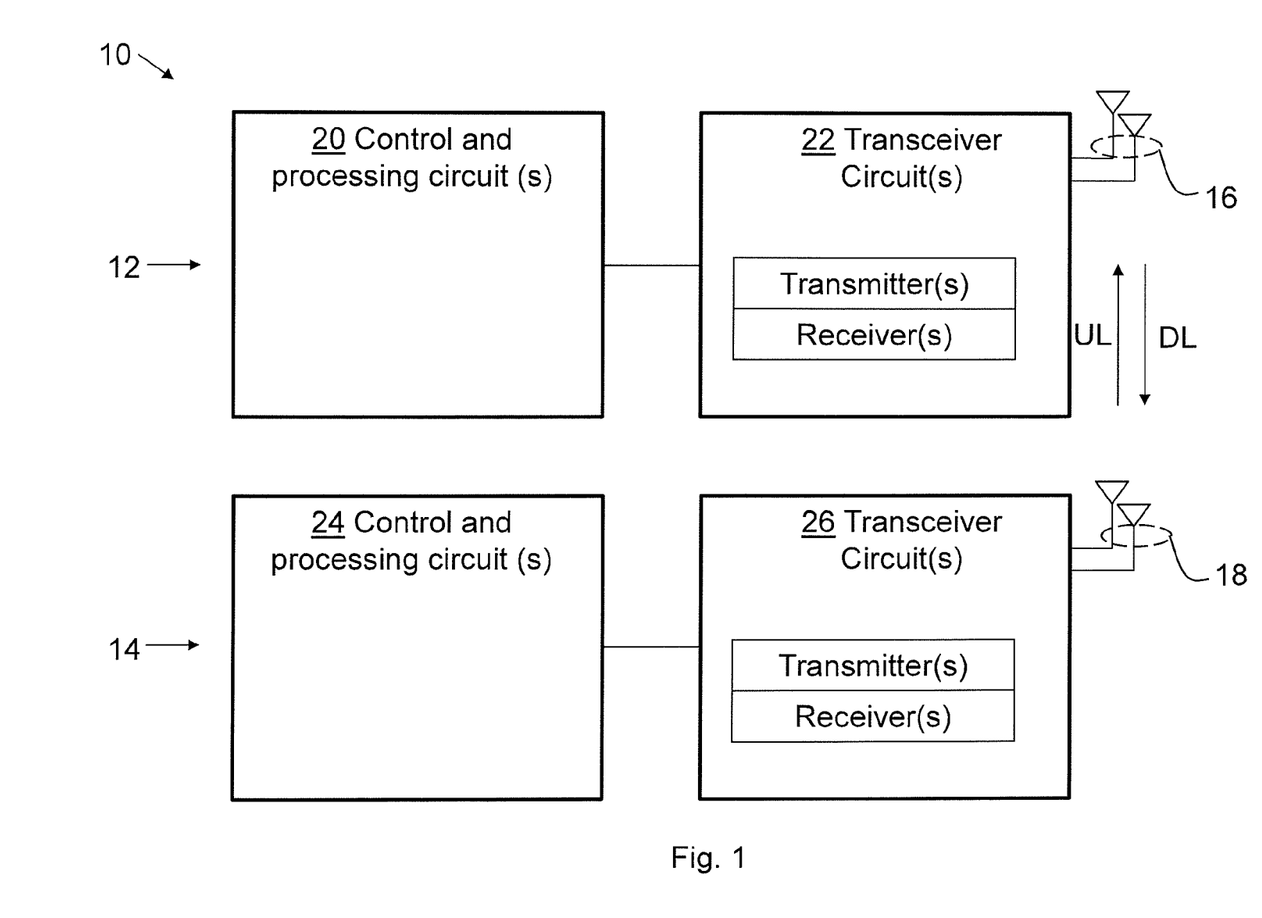
FIG. 1 shows a block diagram depicting a user equipment and a base station according to embodiments herein.

FIG. 1 is a block diagram of a wireless communications network 10, e.g., a 3GPP WCDMA/HSPA network, that includes a base station 12, e.g. a NodeB, and one or more user equipment (UE) 14. It should be understood by the skilled in the art that "user equipment" is a non-limiting term which means any wireless terminal, device or node e.g. Personal Digital Assistant (PDA), laptop, mobile, machine type communication device, sensor, relay, mobile tablets or even a small base station communicating within respective cell.

The base station 12 may also be referred to as e.g. a NodeB, a radio base station, a base transceiver station, Access Point Base Station, base station router, or any other network unit capable to communicate with a user equipment within a cell served by the base station 12 depending e.g. of the radio access technology and terminology used.

The base station 12 provides feedback for transmissions of a secondary stream out of a primary and a secondary stream of the user equipment 14. The user equipment 14 is in an uplink MIMO mode. The base station 12 transmits a preferred transmission rank and an offset for the secondary stream in a channel. The user equipment 14 monitors the channel carrying the transmission rank and the offset for the secondary stream. The user equipment 14 then uses the preferred transmission rank and the offset when transmitting data in the secondary stream. The offset is used by the user equipment 14 to decide transport block size of the secondary stream. The transport block size is thus more accurate and the transmissions are more optimal for the user equipment 14 in MIMO operation avoiding a reduced performance of the wireless communications network 10. Furthermore, the user equipment uses the preferred transmission rank when deciding a transmission rank.

The base station 12 includes a plurality of antennas 16, and the user equipment 14 similarly includes a plurality of antennas 18, which antennas may be used for MIMO transmissions to/from the user equipment 14. The base station 12 also includes one or more control and processing circuits 20 and a transceiver circuit 22. According to embodiments herein the transceiver circuit 22 of the base station 12 is configured to transmit, to the user equipment 14, a preferred transmission rank and an offset for the secondary stream in a channel.

The user equipment 14 similarly includes one or more control and processing circuits 24 and a transceiver circuit 26. The control and processing circuits 20, 24 may include hardware, software, or any combination thereof. According to embodiments herein the control and processing circuit 24 of the user equipment 14 is configured to monitor a channel, from the base station 12, carrying a preferred transmission rank and an offset for the secondary stream. The control and processing circuit 24 is configured to use the preferred transmission rank and the offset when transmitting data in the secondary stream, wherein the offset is used to decide transport block size of the secondary stream and the preferred transmission rank is used to decide the transmission rank. Respective transceiver circuit 22,26 may comprise one or more transmitters and receivers. The control and processing circuit 24 of the user equipment 14 may then transmit data according to the preferred rank and with transport block size for the secondary stream based on the received data from the base station 12.

According to embodiments herein, a method of signaling a preferred transmission rank, also called MIMO rank, e.g. whether rank1 or rank 2 is preferred for MIMO, and an offset, also called Signal to Interference Ratio (SIR) offset, used to decide a transport block size of a secondary MIMO stream is disclosed. The preferred transmission rank and offset value is signaled in a HSUPA network. The transmission may comprise signaling over a new Absolute Rank and SIR Offset Channel (A-ROCH), which may use the same structure as the existing E-AGCH channel. Some embodiments further disclose how to signal the preferred rank, i.e. whether rank1 or rank2 is preferred.

Figure 2:
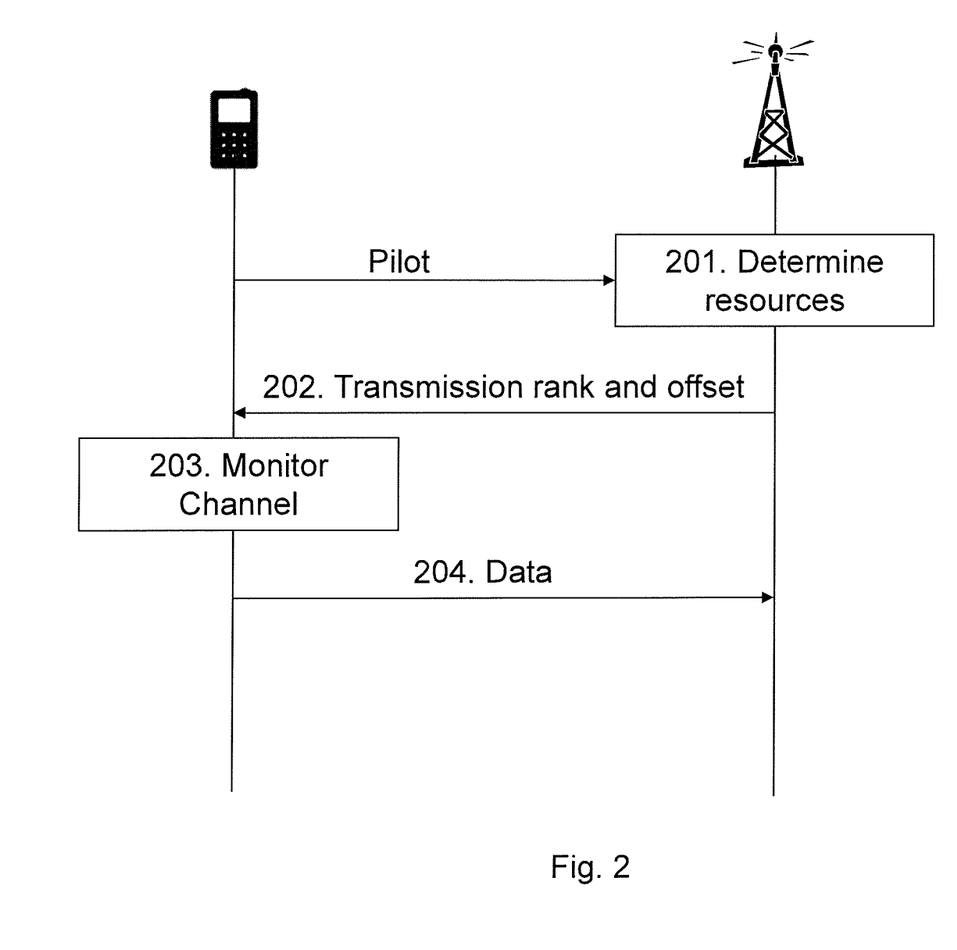
FIG. 2 shows a schematic combined flow chart and signaling scheme according to embodiments herein.

FIG. 2 is a schematic combined flow chart and signaling scheme. According to one or more embodiments, for MIMO operation it is proposed to use a single Inner Loop Power Control (ILPC) operating on the Primary (P)-DPCCH and a single Outer Loop Power Control (OLPC) that controls the quality of a primary stream out of at least the primary and a secondary stream of the MIMO operation. One of the main reasons for this choice is to keep commonality with Closed-Loop Transmit Diversity (CLTD), for rank1 transmissions, with the primary stream corresponding to a "legacy" stream, and the secondary stream being more of a "best effort" stream. Furthermore a common grant may be used that is shared equally between streams, which implies that power is shared equally between streams. Legacy E-TFC selection procedures based on the effective (serving) grant may be used, corresponding to the whole signaled grant for rank1 and, half or whole, the signaled grant for rank2, to determine the TBS for the primary stream. Consequently, the data transmit power, e.g. for Primary E-DPDCH and Secondary (S)-E-DPDCH, may also be determined via procedures based on the primary stream E-TFCI. The legacy procedure may be modified for MIMO to incorporate rank specific reference values, which are signaled by higher layers. Transmission rank indicates number of streams to transmit.

Action 201.

The base station 12 receives e.g. a pilot signal on the secondary stream and determines preferred rank and offset based on the received pilot. The base station 12 may receive two pilot channels corresponding to primary stream and secondary stream, DPCCH and Secondary (S)-DPCCH. Based on these two pilot channels, the base station 12, serving the user equipment 14, may calculate the quality of the streams, e.g. based on SIRs, and from that deduce whether the user equipment 14 preferably should transmit one or two streams. Furthermore, the base station 12 may calculate an appropriate offset. For example, to control the quality of data transmissions associated with the secondary stream the user equipment 14 may dynamically adjust which E-TFC the user equipment 14 should use, given a certain grant, based on feedback from the network. The main benefit by having network controlled feedback is that the base station 12 may calculate received SINRs and based on that and Block Error Rate (BLER) statistics for the secondary stream the base station 12 may deduce what rate that may be supported. Let $SIR_1$, $SIR_{21}$ and $SIR_{22}$ be the received SINRs associated with a single stream transmission, the primary stream rank2 transmission and the secondary stream rank2 transmission, respectively. Assuming a linear receiver, the same total transmit power and the same channel conditions in all cases the relations will in general be:

$$SIR_1 >> SIR_{21} > SIR_{22} \quad (eq. 1)$$

since inter-stream interference occurs due to code-reuse for rank2 transmissions, and since the pre-coding selection often makes the primary stream better than the secondary stream. Since the legacy E-TFC selection mechanism is tightly coupled to $SIR_1$ the user equipment 14 may choose a too large TBS for rank2 transmissions if the TBS selection is based on the serving grant and the legacy E-TFC selection mechanism. However, embodiments herein decide the primary stream TBS based on the serving grant minus $\Delta_1$, where:

$$\Delta_1 = SIR_1 - SIR_{21} \text{ (dB)} \quad (eq. 2)$$

To avoid signaling $\Delta_1$ continuously it is proposed to use rank dependent E-TFC selection reference values, see "Embodiment 3" below, since $SIR_1$ and $SIR_{21}$ are rather constant given a fixed SIR target due to that DPCCH is power controlled. Similarly the secondary stream TBS may be based on the serving grant minus $\Delta_2$, where:

$$\Delta_2 = SIR_1 - SIR_{21} \text{ (dB)} \quad (eq. 3)$$

However, since S-DPCCH is not power controlled $\Delta_2$ may vary quite substantially.

Based on the discussion above, embodiments herein derive the TBS for the secondary stream based on the MIMO E-TFC selection mechanism using the serving grant minus $\Delta$ (in dB), where the SIR difference between the primary and the secondary stream which is dynamically signaled to the user equipment 14 by the network is shown by:

$$\Delta = SIR_{21} - SIR_{22} \quad (eq. 4)$$

Note that $\Delta$ is signaled rather than $\Delta_2$ because the E-TFC reference values are rank dependent $\Delta = \Delta_2 - \Delta_1$, but $\Delta_1$ is compensated for by having rank dependent E-TFC reference values. The $\Delta$ value may then be additionally modified in order to assure the correct BLER target for the secondary stream. The exact details may be implementation specific.

Action 202.

The base station 12 transmits rank and offset for the secondary stream to the user equipment 14. A new channel may be used to signal the preferred transmission rank, and the absolute offset used to decide the secondary stream TBS. Herein this channel is referred to as the Absolute Rank and SIR Offset Channel (A-ROCH). The A-ROCH uses the same structure or format as the E-AGCH, i.e. it is a shared channel utilizing ID-specific CRC attachment with in total 6 information bits. For more information about the E-AGCH see TS-25.212, "Multiplexing and channel coding (FDD)", v11.0.0, section 4.10.

In some embodiments the E-AGCH and the A-ROCH may by default use different channelization codes configured by the network, such as the base station 12 or an RNC, and different Identities (ID) or UE masks, which is used to signal identity of a user equipment. The user equipment 14 may monitor both these channels. In one embodiment the network is allowed to configure the E-AGCH and the A-ROCH to use the same channelization code but different UE masks in order to save code resources, and UE de-spreader capacity. In these embodiments the E-AGCH and A-ROCH are then transmitted separated in time and the user equipment 14 monitors and detects, in a resource efficient manner, whether it is an E-AGCH or an A-ROCH transmission based on the UE mask used. Thus, the channelization codes are reused for different channels in an efficient manner. The UE masks are stored in the user equipment 14. In some embodiments the network is allowed to configure the E-AGCH and the A-ROCH to use different channelization code but the same UE mask. In these cases the E-AGCH and the A-ROCH may be transmitted simultaneously. The A-ROCH needs to be transmitted whenever the rank is changing, but it may be transmitted otherwise as well to signal a new offset value, e.g. an absolute SIR offset value. Since the A-ROCH is CRC protected, it is very likely that the correct information is decoded whenever the channel is detected. Furthermore, these two channels may use both different UE masks and different channelization codes.

Different embodiments for how to interpret the bits of the A-ROCH may be envisioned:

A scope bit may be used to indicate the sign of the offset value, i.e. whether the offset value is positive or negative. In this case may existing grant tables potentially be reused to signal the absolute offset. In this case one value, e.g. one bit or one bit sequence, is used to indicate that rank 1 is preferred, e.g. similar to the existing E-AGCH values ZERO GRANT or INACTIVE. The remaining 5 bits, $2^5-1$ values, may then be used to signal the offset.

The scope bit may be used to indicate the preferred rank. The remaining 5 bits may be used to signal the offset The scope bit may be used to indicate whether the rank change targets a specific Hybrid automatic repeat request (HARQ) process or applies to all HARQ processes, similar to the E-AGCH scope bit meaning. In this case one value, one bit or one bit sequence, is used to indicate that rank 1 is preferred (e.g. similar to the existing E-AGCH values ZERO GRANT or INACTIVE). The remaining 5 bits, $2^5-1$ values, may then be used to signal the offset.

The scope bit may be removed. In this case essentially all 6 bits may be used to signal the offset value. In this case one value, one bit or one bit sequence, is used to indicate that rank 1 is preferred, e.g. similar to the existing E-AGCH values ZERO GRANT or INACTIVE.

According to some embodiments wherein the A-ROCH is of a format according to E-AGCH, the transmission rank is indicated in a bit corresponding to a bit indicating process to apply absolute grant value in the E-AGCH. One bit may indicate whether rank 2 is allowed, and the remaining five bits indicates an index that via a table gives the offset value.

Action 203.

The user equipment 14 monitors i.e. detects the channels for a transmission and decodes A-ROCH when detected. The user equipment 14 may detect A-ROCH or E-AGCH based on user equipment identities such as an E DCH Radio Network Identifier.

Action 204.

The user equipment 14 uses the received preferred transmission rank Thus, the secondary stream TBS may be decided based on the MIMO E-TFC selection mechanism using the serving grant minus a network signaled offset Δ (in dB).

Figure 3:
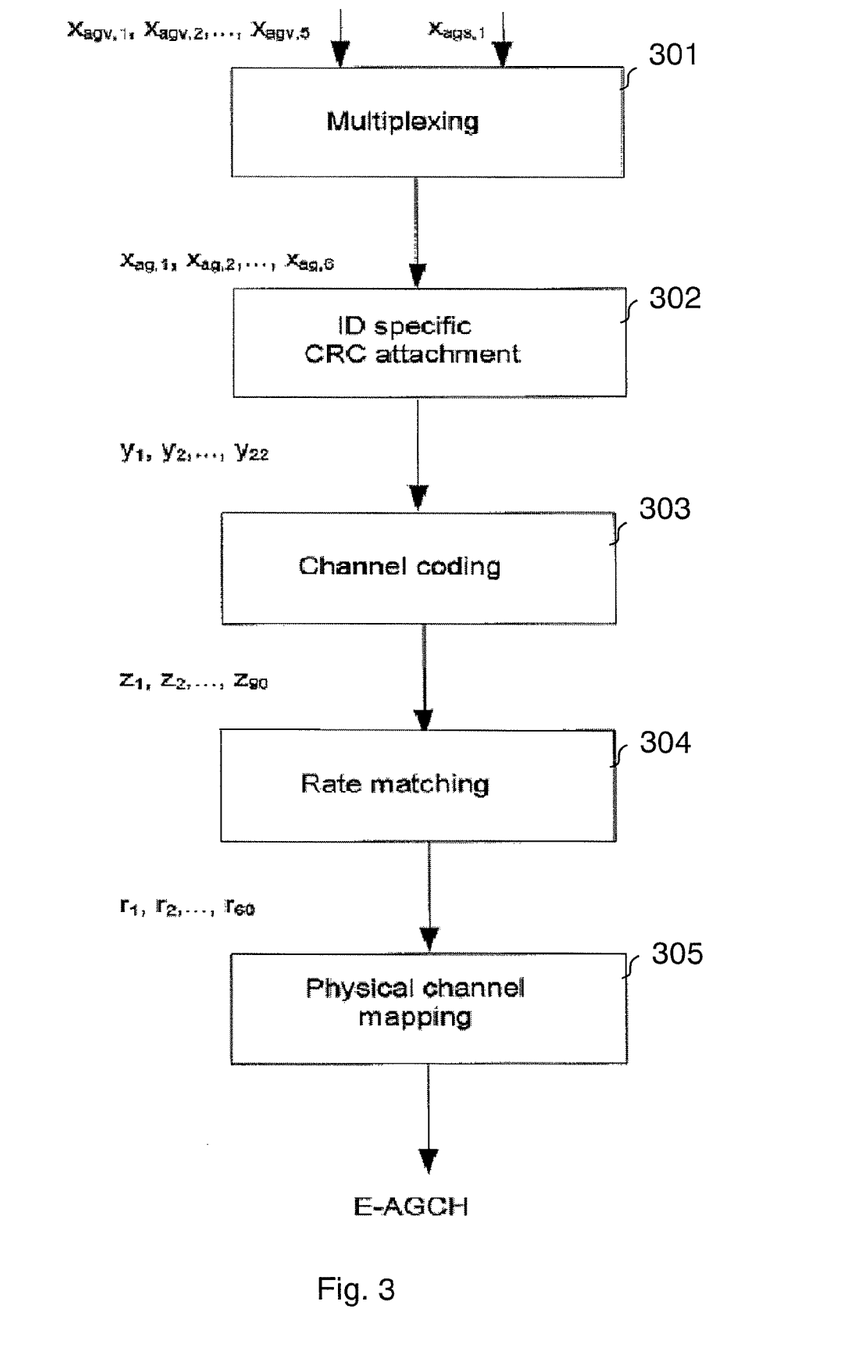
FIG. 3 shows a flow chart depicting a coding chain of a E-AGCH.

Referring to FIG. 3 herein, E-AGCH is coded in the base station 12 according to a coding chain illustrated in FIG. 3. The subscript "agv" refers to absolute grant value, and the subscript "ags" refers to absolute grant scope, thus, the inputs into the "Multiplexing step" are absolute grant values $x_{agv,1}$, $x_{agv,2} \ldots x_{agv,5}$ and absolute grant scope $x_{ags,1}$.

Action 301.

The Absolute Grant Value information $x_{agv,1}$, $x_{agv,2}$, ..., $x_{agv,5}$ and Absolute Grant Scope information $x_{ags,1}$ are multiplexed together. This gives a sequence of bits $x_{ag,1}$, $x_{ag,2}, \ldots, x_{ag,6}$ Action 302.

An ID specific CRC attachment is then added to the bits. The E-RNTI is the E-DCH Radio Network Identifier. The E-RNTI is mapped such that $x_{id,1}$ corresponds to the Most Significant Bit (MSB).

From the sequence of bits $x_{ag,1}$, $x_{ag,2}, \ldots, x_{ag,6}$ a 16 bit CRC is calculated. That gives the sequence of bits $c_1$, $c_2, \ldots, c_{16}$. This sequence of bits is then masked with $x_{id,1}$, $x_{id,2}, \ldots, x_{id,16}$ and appended to the sequence of bits $x_{ag,1}$, $x_{ag,2}, \ldots, x_{ag,6}$ to form the sequence of bits $y_1, y_2, \ldots, y_{22}$ where $$y_i = x_{ag,i} \; i=1,2,\ldots,6$$

$$y_i = (c_{i-6} + x_{id,i-6}) \bmod 2 \; i=7,\ldots,22.$$

Action 303.

The channel is then coded. Rate 1/3 convolutional coding is applied to the sequence of bits $y_1, y_2, \ldots, y_{22}$, resulting in the sequence of bits $z_1, z_2, \ldots, z_{90}$.

Action 304.

A rate matching is then performed on the coded bits. From the input sequence $z_1, z_2, \ldots, z_{90}$ the bits $z_1, z_2, z_5, z_6, z_7, z_{11}$, $z_{12}, z_{14}, z_{15}, z_{17}, z_{23}, z_{24}, z_{31}, z_{37}, z_{44}, z_{47}, z_{61}, z_{63}, z_{64}, z_{71}$, $z_{72}, z_{75}, z_{77}, z_{80}, z_{83}, z_{84}, z_{85}, z_{87}, z_{88}, z_{90}$ are punctured to obtain the output sequence $r_1, r_2, \ldots, r_{60}$.

Action 305.

The coded bits are then mapped to a physical channel. The sequence of bits $r_1, r_2, \ldots, r_{60}$ is mapped to the corresponding E-AGCH sub frame. The bits $r_k$ are mapped so that they are transmitted over the air in ascending order with respect to k. If the E-DCH Transmission Time Interval (TTI) is equal to 10 ms, the same sequence of bits is transmitted in all the E-AGCH sub frames of the E-AGCH radio frame.

As the suggested A-ROCH is structured in a same format as the E-AGCH, the coding chain of the A-ROCH follows the coding chain of the E-AGCH. However, as disclosed in some embodiments the scope bit of the E-AGCH will be replaced by a rank indicator bit and the absolute grant values may be replaced by offset values. E.g. Offset values may be denoted as, $x_{o,1}, x_{o,2}, \ldots, x_{o,5}$; instead of $x_{agv,1}, x_{agv,2} \ldots x_{agv,5}$; and rank bit may denoted as $x_{r,1}$ instead of $x_{ags,1}$. Furthermore, the multiplexed bits may be noted $x_{ro,1} \ldots x_{ro,6}$ instead of $x_{ag,1} \ldots x_{ag,6}$ indicating transmission rank and offset bits instead of absolute grant bits.

Table 1 below discloses absolute grant values in an index list. Hence, the base station 12 may transmit the index in order to indicate the absolute grant value. Similarly, the offset values may be structured in an indexed list and the base station 12 may transmit the index to the user equipment 14.

TABLE 1

Mapping of Absolute Grant Value

| Absolute Grant Value | Index |
|---|---|
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| $(95/15)^2 \times 4$ | 24 |
| $(168/15)^2$ | 23 |
| $(150/15)^2$ | 22 |
| $(134/15)^2$ | 21 |
| $(119/15)^2$ | 20 |
| $(106/15)^2$ | 19 |
| $(95/15)^2$ | 18 |
| $(84/15)^2$ | 17 |
| $(75/15)^2$ | 16 |
| $(67/15)^2$ | 15 |
| $(60/15)^2$ | 14 |
| $(53/15)^2$ | 13 |
| $(47/15)^2$ | 12 |
| $(42/15)^2$ | 11 |
| $(38/15)^2$ | 10 |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| ZERO_GRANT* | 1 |
| INACTIVE* | 0 |

Figure 4:
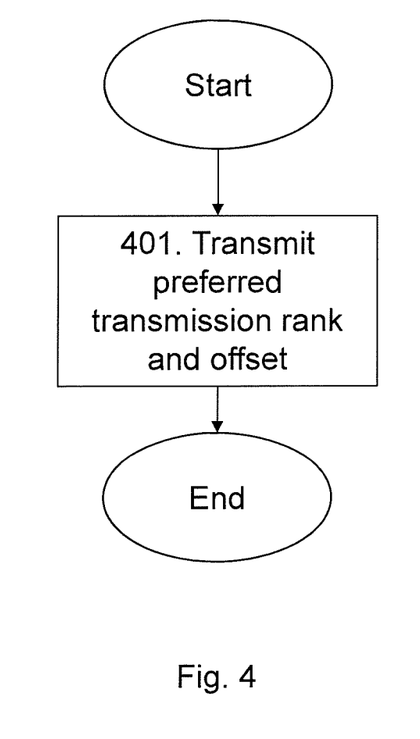
FIG. 4 is a flow chart depicting a method in a base station according to embodiments herein.

The method action in the base station 12 for providing feedback to the user equipment 14 for transmissions of a secondary stream out of a primary and a secondary stream of the user equipment 14 according to some embodiments will now be described with reference to a flowchart depicted in FIG. 4. The user equipment 14 is configured in an uplink Multiple Input Multiple Output mode.

Action 401.

The base station 12 transmits to the user equipment 14, a preferred transmission rank and an offset for the secondary stream in a channel. The offset is to be used by the user equipment 14 when deciding transport block size of the secondary stream and the preferred transmission rank is to be used by the user equipment 14 when deciding a transmission rank, e.g. number of streams to transmit. The channel may be of a format defined by a shared channel utilizing identity-specific cyclic redundancy check attachment. The channel may comprise six information bits. One bit may indicate the preferred transmission rank and five bits may indicate the offset. In some embodiments the one bit indicates a rank change and targets a specific HARQ process or applies to all HARQ processes.

In some embodiments, the channel uses a same channelization code as the E-AGCH, and the channel uses a different user equipment identity or a different user equipment mask than the E-AGCH. In some embodiments, the channel uses a different channelization code as the E-AGCH, and the channel uses a same user equipment mask or the same user equipment identity as the E-AGCH. In some embodiments, the channel uses a different channelization code as the E-AGCH, and the channel uses a different user equipment mask or a different user equipment identity as the E-AGCH. If the channel uses a different channelization code than the E-AGCH, then the channels may be transmitted/received simultaneously, as any other code-multiplexed channel. The channel may be transmitted when the preferred transmission rank is changed, and/or when a new offset value, e.g. absolute SIR offset value, should be conveyed.

Figure 5:
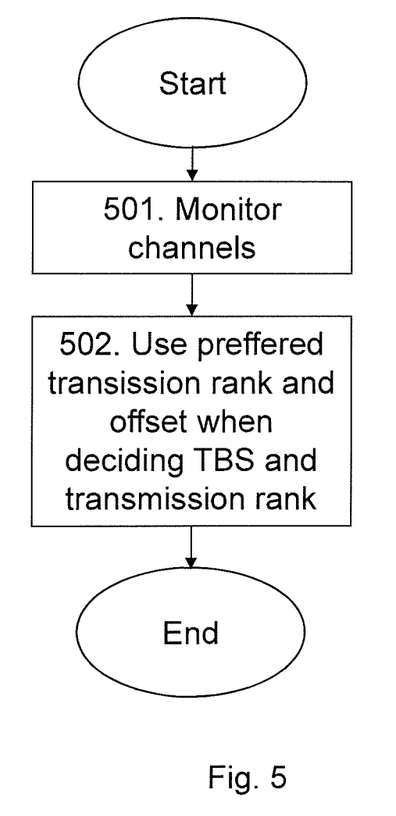
FIG. 5 is a flow chart depicting a method in a user equipment according to embodiments herein.

The method actions in the user equipment 14 for handling transmissions of a secondary stream out of a primary and a secondary stream according to some embodiments will now be described with reference to a flowchart depicted in FIG. 5. The actions do not have to be taken in the order stated below, but may be taken in any suitable order. Actions performed in some embodiments are marked with dashed boxes. The user equipment 14 is in an uplink MIMO mode.

Action 501.

The user equipment 14 monitors a channel, from the base station 12, carrying a preferred transmission rank and an offset for the secondary stream. Thus, the user equipment 14 detects a preferred transmission rank and an offset for the secondary stream.

Action 502.

The user equipment 14 uses the preferred transmission rank and the offset when transmitting data in the secondary stream, wherein the offset is used to decide transport block size of the secondary stream and the preferred transmission rank is used to decide the transmission rank. The channel may be of a format defined by a shared channel utilizing identity-specific cyclic redundancy check attachment. As stated above, the channel may comprise six information bits. E.g. one bit may indicate the preferred transmission rank and five bits may indicate the offset. Additionally or alternatively, one bit indicates a rank change and targets a specific HARQ process or applies to all HARQ processes.

The channel may use a same channelization code as the E-AGCH, and the channel uses a different user equipment mask or user equipment identity than the E-AGCH. The user equipment 14 identifies the channel and the E-AGCH based on the user equipment mask or the user equipment identity. The channel may alternatively use a different channelization code as the E-AGCH, and the channel may use a same user equipment mask or a same user equipment identity as the E-AGCH. The user equipment 14 may then identify the channel and the E-AGCH based on channelization code. Alternatively, the channel may use a different channelization code as the E-AGCH, and the channel may also use a different user equipment mask or a different user equipment identity as the E-AGCH. The user equipment 14 may then identify the channel and the E-AGCH based on channelization code and/or user equipment mask or user equipment identity.

The embodiments herein for signaling the preferred transmission rank and the offset may be implemented through one or more processors, such as the control and processing circuits 20,24 depicted in FIG. 1, together with computer program code for performing the functions and/or method steps of the embodiments herein. The program code mentioned above may also be provided as a computer program product, for instance in the form of a data carrier carrying computer program code for performing embodiments herein when being loaded into the user equipment 14 or the base station 12. One such carrier may be in the form of a CD ROM disc. It is however feasible with other data carriers such as a memory stick. The computer program code may furthermore be provided as pure program code on a server and downloaded to the user equipment 14 or the base station 12.

The user equipment 14 and the base station 12 comprise a respective memory that may comprise one or more memory units and may be used to store for example data such as channelization code, offset, rank, feedback, UE identities, channel data, applications to perform the methods herein when being executed on the base station 12 or the user equipment 14. The user equipment 14 keeps the rank and offset information in memory until it receives a next A-ROCH message, wherein it up-dates the memory with new information.

Those skilled in the art will also appreciate that the various "circuits" described may refer to a combination of analog and digital circuits, and/or one or more processors configured with software and/or firmware, e.g., stored in memory, that, when executed by the one or more processors, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for purposes of limitation, the scope of the embodiments being defined by the following claims.

ABBREVIATIONS

MIMO Multiple Inputs Multiple Outputs
SINR Signal-to-interference-and-noise ratio
QAM Quadrature Amplitude Modulation
ILPC Inner loop power control
OLPC Outer loop power control
TBS Transport block size
E-DCH Enhanced Dedicated Channel
E-DPDCH E-DCH Dedicated Physical Data Channel
E-DPCCH E-DCH Dedicated Physical Control Channel (FDD only)
E-RGCH E-DCH Relative Grant Channel
E-AGCH E-DCH Absolute Grant Channel
E-TFCI E-DCH Transport Format Combination Indicator
E-TFC E-DCH Transport Format Combination
DPCCH Dedicated Physical Control Channel
HSPA High Speed Packet Access
HSDPA High Speed Downlink Packet Access
HSUPA High Speed Uplink Packet Access
HS-SCCH High Speed Shared Control Channel
RNC Radio Network Controller
RRC Radio Resource Control
SIB System Information Broadcast
Tx Transmit
TxD Transmit Diversity
UE User Equipment
UL Uplink

The invention claimed is:

1. A method in a base station for providing feedback to a user equipment for transmissions of a secondary stream out of a primary stream and a secondary stream of the user equipment in an uplink Multiple Input Multiple Output mode, the method comprising:

transmitting, to the user equipment, a preferred transmission rank and an offset between signal to interference ratio (SIR) values or signal to interference-plus-noise ratio (SINR) values for the secondary stream in a channel, wherein the offset between SIR or SINR values is to be used by the user equipment when deciding a transport block size of the secondary stream and the preferred transmission rank is to be used by the user equipment when deciding a transmission rank.

2. The method according to claim 1, wherein the channel is of a format defined by a shared channel utilizing identity-specific cyclic redundancy check attachment.

3. The method according to claim 1, wherein the channel uses a same channelization code as an Enhanced Dedicated Channel Absolute Grant Channel, E-AGCH, and the channel uses a different user equipment identity or a different user equipment mask than the E-AGCH.

4. The method according to claim 1, wherein the channel uses a different channelization code as an Enhanced Dedicated Channel Absolute Grant Channel, E-AGCH, and the channel uses a same user equipment mask or the same user equipment identity as the E-AGCH.

5. The method according to claim 1, wherein the channel uses a different channelization code as an Enhanced Dedicated Channel Absolute Grant Channel, E-AGCH, and the channel uses a different user equipment mask or a different user equipment identity as the E-AGCH.

6. The method according to claim 1, wherein the channel is transmitted when the preferred transmission rank is changed, and/or when a new offset value should be conveyed.

7. The method according to claim 1, wherein the channel comprises six information bits, and wherein one bit indicates the preferred transmission rank and five bits indicate the offset.

8. The method according to claim 1, wherein one bit indicates a rank change and targets a specific Hybrid automatic repeat request, HARQ, process or applies to all HARQ processes.

9. A method in a user equipment for handling transmissions of a secondary stream out of a primary stream and a secondary stream wherein the user equipment is in an uplink Multiple Input Multiple Output mode, comprising:
    monitoring a channel, from a base station, carrying a preferred transmission rank and an offset between signal to interference ratio (SIR) values or signal to interference-plus-noise ratio (SINR) values for the secondary stream; and
    using the preferred transmission rank and the offset between SIR or SINR values when transmitting data in the secondary stream, wherein the offset between SIR or SINR values is used to decide a transport block size of the secondary stream and the preferred transmission rank is used to decide a transmission rank.

10. The method according to claim 9, wherein the channel is of a format defined by a shared channel utilizing identity-specific cyclic redundancy check attachment.

11. The method according to claim 9, wherein the channel uses a same channelization code as an Enhanced Dedicated Channel Absolute Grant Channel, E-AGCH, and the channel uses a different user equipment mask or user equipment identity than the E-AGCH, wherein the user equipment identifies the channel and the E-AGCH based on the user equipment mask or the user equipment identity.

12. The method according to claim 9, wherein the channel uses a different channelization code as an Enhanced Dedicated Channel Absolute Grant Channel, E-AGCH, and the channel uses a same user equipment mask or a same user equipment identity as the E-AGCH, wherein the user equipment identifies the channel and the E-AGCH based on channelization code.

13. The method according to claim 9, wherein the channel uses a different channelization code as an Enhanced Dedicated Channel Absolute Grant Channel, E-AGCH, and the channel uses a different user equipment mask or a different user equipment identity as the E-AGCH, wherein the user equipment identifies the channel and the E-AGCH based on channelization code and/or user equipment mask or user equipment identity.

14. The method according to claim 9, wherein the channel comprises six information bits, and wherein one bit indicates the preferred transmission rank and five bits indicate the offset.

15. The method according to claim 9, wherein one bit indicates a rank change and targets a specific Hybrid automatic repeat request, HARQ, process or applies to all HARQ processes.

16. A base station adapted for providing feedback to a user equipment for transmissions of a secondary stream out of a primary stream and a secondary stream of the user equipment in an uplink Multiple Input Multiple Output mode, the base station comprising:
    one or more transceiver circuits;
    one or more memory units having computer program code; and
    one or more processors coupled to the one or more transceiver circuits and to the one or more memory units, wherein the one or more memory units' computer program code, when executed by the one or more processors, causes the base station to transmit, to the user equipment, a preferred transmission rank and an offset between signal to interference ratio (SIR) values or signal to interference-plus-noise ratio (SINR) values for the secondary stream in a channel via the one or more transceiver circuits, wherein the offset between SIR or SINR values is to be used by the user equipment when deciding a transport block size of the secondary stream and the preferred transmission rank is to be used by the user equipment when deciding a transmission rank.

17. The base station according to claim 16, wherein the channel is of a format defined by a shared channel utilizing identity-specific cyclic redundancy check attachment.

18. The base station according to claim 16, wherein the channel uses a same channelization code as an Enhanced Dedicated Channel Absolute Grant Channel, E-AGCH, and the channel uses a different user equipment identity or a different user equipment mask than the E-AGCH.

19. The base station according to claim 16, wherein the channel uses a different channelization code as an Enhanced Dedicated Channel Absolute Grant Channel, E-AGCH, and the channel uses a same user equipment mask or the same user equipment identity as the E-AGCH.

20. The base station according to claim 16, wherein the channel uses a different channelization code as an Enhanced Dedicated Channel Absolute Grant Channel, E-AGCH, and the channel uses a different user equipment mask or a different user equipment identity as the E-AGCH.

21. The base station according to claim 16, wherein the base station is configured to transmit in the channel when the preferred transmission rank changes, and/or when a new offset value should be conveyed.

22. The base station according to claim 16, wherein the channel comprises six information bits, and wherein one bit indicates the preferred transmission rank and five bits indicates the offset.

23. The base station according to claim 16, wherein one bit indicates a rank change and targets a specific Hybrid automatic repeat request, HARQ, process or applies to all HARQ processes.

24. A user equipment adapted for handling transmissions of a secondary stream out of a primary stream and a secondary stream wherein the user equipment is in an uplink Multiple Input Multiple Output mode, the user equipment comprising:
one or more transceiver circuits;
one or more memory units having computer program code; and
a control and processing circuit having one or more processors coupled to the one or more transceiver circuits and to the one or more memory units, wherein the one or more memory units' computer program code, when executed by the one or more processors, causes: i) the user equipment to monitor a channel, from a base station, carrying a preferred transmission rank and an offset between signal to interference ratio (SIR) values or signal to interference-plus-noise ratio (SINR) values for the secondary stream; and ii) the user equipment to use the preferred transmission rank and the offset between SIR or SINR values when transmitting data in the secondary stream via the transceiver circuit, wherein the offset between SIR or SINR values is used to decide a transport block size of the secondary stream and the preferred transmission rank is used to decide a transmission rank.

25. The user equipment according to claim 24, wherein the channel is of a format defined by a shared channel utilizing identity-specific cyclic redundancy check attachment.

26. The user equipment according to claim 24, wherein the channel uses a same channelization code as an Enhanced Dedicated Channel Absolute Grant Channel, E-AGCH, and the channel uses a different user equipment mask or user equipment identity than the E-AGCH, wherein the user equipment identifies the channel and the E-AGCH based on the user equipment mask or the user equipment identity.

27. The user equipment according to claim 24, wherein the channel uses a different channelization code as an Enhanced Dedicated Channel Absolute Grant Channel, E-AGCH, and the channel uses a same user equipment mask or a same user equipment identity as the E-AGCH, wherein the user equipment identifies the channel and the E-AGCH based on channelization code.

28. The user equipment according to claim 24, wherein the channel uses a different channelization code as an Enhanced Dedicated Channel Absolute Grant Channel, E-AGCH, and the channel uses a different user equipment mask or a different user equipment identity as the E-AGCH, wherein the user equipment identifies the channel and the E-AGCH based on channelization code and/or user equipment mask or user equipment identity.

29. The user equipment according to claim 24, wherein the channel comprises six information bits, and wherein one bit indicates the preferred transmission rank and five bits indicate the offset.

30. The user equipment according to claim 24, wherein one bit indicates a rank change and targets a specific Hybrid automatic repeat request, HARQ, process or applies to all HARQ processes.

* * * * *